United States Patent Office 2,933,135
Patented Apr. 19, 1960

2,933,135
WELL STRATA PRODUCTIVITY CONTROL

Everett A. Johnson, Park Ridge, Ill., assignor to Standard Oil Company, Chicago, Ill., a corporation of Indiana No Drawing. Continuation of application Serial No. 84,746, March 31, 1949. This application November 1, 1955, Serial No. 544,346

12 Claims. (Cl. 166—42)

This invention relates to an improved method and means for controlling the flow of fluids in subterranean formations. More particularly, the invention pertains to a method and means for fracturing lateral channels in selected formations traversed by oil and gas wells and for sealing such channels if water is produced from the fractured formation.

Many methods have been heretofore proposed for controlling the drainage area within the selected producing zone of an oil or gas well. For example, explosives have been detonated in a well to enlarge the well diameter or to fracture the formations immediately adjacent the well. The use of explosives, however, is restricted in many cases due to the presence of metal conduits in the hole, the expense, the hazards involved, the uncertainty or uncontrollability of the process, and the tendency of the explosive force to compact the face of the formation. Horizontal drilling likewise has been proposed for increasing the surface area of a well in a selected zone; this requires cumbersome apparatus, does not find general application, and the increased productivity is rarely commensurate with the increased cost of drilling. Furthermore, each of these processes is limited by being ineffective for extending drainage channels or fractures any appreciable distance into the well formation. Acidizing is sometimes practiced to increase permeability of certain types of formations immediately adjacent the well bore, but this process is limited by practical considerations to use in calcareous formations, and, in general, does not provide lateral drainage channels to the extent necessary to increase production appreciably.

It has been found that the formation adjacent a well may be hydraulically fractured without the disadvantages of the prior systems by disposing a gelled oily fluid therein, and applying a pressure sufficiently high to separate the formation. In such an operation it is important that the fluid should not penetrate the formation too rapidly because this precludes attaining the necessary formation breakdown pressure. It is also important that it should not penetrate too far because this makes subsequent removal difficult. It is also desired that the gelled fluid contain a propping agent suspended therein so that once a fracture is formed in the formation, its closing is prevented by the props and a channel which is permeable to the desired fluid is produced. Accordingly, another object of my invention is to provide a method and means for fracturing a formation and for producing a propped channel which may be maintained permeable to non-aqueous well fluids and selectively rendered impermeable to aqueous fluids. It is also an object of the invention to provide an improved fracturing fluid composition. These and other objects of my invention will become apparent as the description thereof proceeds.

According to the present invention, a propping agent comprising a water-sensitive solid, such as a hydraulic cementitious material or a dispersed hydraulically-settable inorganic gel is incorporated in the fracturing gel to form a stable suspension. Suitable settable propping agents for use in my invention are hydraulically-settable solids, such as Portland cement clinker, having a particle size of between about 10 and 100 mesh or smaller. Hydraulic solids of intermediate settable character, such as bentonitic clay, silica and alumina gels, etc., which seal upon contact with water, but do not permanently set, likewise can be used.

The propping agents may comprise hydraulic cements, such as coarsely ground cement clinker, which are initially permeable to both aqueous and non-aqueous fluids but become impermeable to aqueous fluids upon prolonged contact therewith. Upon selective removal of the organic gel, the settable propping agent remains in the fracture. When non-aqueous fluids, such as oil, gas, and the like, flow through the propped channel, the permeability does not decrease. Accordingly, such a channel remains permeable to oil so long as oil is being produced. However, upon the encroachment of water, the channel will become less permeable and will eventually seal off those portions of the formation from which other aqueous fluids flow.

For the purposes of my invention, I prefer to use crushed cement clinker which is an intermediate product in the manufacture of Portland cement. As the clinker is removed from the rotary furnace, it is reduced to the desired size by crushing which may be between about 20 and 100 mesh, preferably between about 40 to 60 mesh. The suspended solids in cooperation with the gel retard penetration of the gelled oil into the pores of the formation during the fracturing step and hence the size range and the particle size distribution of the added solids is dictated at least in part by the porosity of the formation to be fractured. Thus, the particles should be of such size as to be retained on the face of the formation and thereby reduce the tendency of the gel to flow into the formation. The cement clinker may have a particle size of between about 10 and 200 mesh and used in concentrations of between about 0.5 and 15 pounds per gallon of the hydrocarbon liquid.

Having produced a cement clinker of the desired size, it is suspended in a gelled hydrocarbon or the clinker and gelling agent can be concurrently added to the hydrocarbon and the fluid suspension pumped into the well where the gelling is completed. Sufficient pressure is exerted upon the suspension of the settable solids and gelled hydrocarbon so that the formation is fractured and at least a part of the suspension is introduced into the fracture. The hydrocarbon portion of the suspension is then removed from the fracture as described hereinafter to leave the ground cement clinker as a propping agent within the fracture. This will provide a permeable zone or lens and as long as oil flows through the channel, hydration of the cement will be inhibited. When oil production is replaced in part or wholly by water, hydration of the packing will begin to take place and will continue until the permeability of the channel is reduced to the point where a virtual seal is obtained, thus preventing further flow of aqueous fluids from the channel into the well.

It is also contemplated that the technique of fracturing a formation with a hydrocarbon gel in which cement clinker has been suspended can be used for "squeeze cementing." Thus, the suspension of gelled hydrocarbon and comminuted cement clinker is used to fracture the formation to be sealed and is placed within the fracture in amount sufficient to effect a proper seal when the cement deposited from the suspension is hydrated, but before such hydration the gelled hydrocarbon is withdrawn from the fracture leaving the cement in place. Subsequently, the cement within the fracture can be contacted with water so as to hydrate the cement and form a water impervious lens. The excess suspension of unhydrated cement is, of course, first pumped from the well, leaving the well bore clean and making unnecessary any subsequent drilling to remove cement from the bore.

In the present invention, the low-penetrating fluid can be produced by gelling an organic liquid, such as, for example, crude or refined hydrocarbons, i.e. gasoline, kerosene, naphtha, fuel oil and diesel oil, chlorinated hydrocarbons, or animal oil, such as lard oil or fish oil, or a vegetable oil, such as cottonseed oil, or the like, and mixtures of two or more of such organic liquids. A suitable bodying or gelling agent for such organic liquids is a material such as the soaps or salts of fatty acids. Soaps produced by or from ammonia or any metal of the alkali metal and alkaline earth metal groups or polyvalent metal groups, such as, for example, magnesium, calcium, strontium, cadmium, mercury, lithium, cobalt, lead, nickel, or aluminum, combined with a fatty acid, produce suitable bodying agents for the normally liquid hydrocarbons. The fatty acid component is preferably one of the aliphatic acids having at least one carboxylic group in aliphatic chain linkage, the aliphatic chain in either case having preferably at least 12 carbon atoms to the chain. Suitable fatty acid compounds which are available commercially are, for example, coconut oil fatty acids, peanut oil fatty acids, palm oil fatty acids, stearic acid, oleic acid, palmitic acid, and the like.

Although the salts of fatty acids, in general, are suitable bodying agents for producing a gelled hydrocarbon for use in my invention, I prefer a metal soap, such as a hydroxy aluminum soap gelling agent, which has the ability to form hydrocarbon gels at ordinary temperatures. The term "hydroxy aluminum soap" as used herein has the meaning ascribed to it in U.S. Patent 2,390,609. A particularly useful soap of this type consists of two distinct components. One is an aluminum soap of a saturated fatty acid, such as the aluminum laureate, containing at least 40 to 50% of this substance, or a functionally-related acid soap. This component of the preferred gelling agent is a relatively high melting solid that if used alone produces only thin and unstable gels. The second component is an aluminum soap or soaps selected from the group including soaps of cycloaliphatic and unsaturated acids, i.e., soaps such as aluminum naphthenate, oleate, oleate-linoleate, or the like. The combination of an aluminum soap of the laureate type, with one or more soaps of the naphthenate or oleate type, give a thickening or bodying agent of distinctive and superior properties not obtained with either component alone. When the soaps are prepared by the precipitation process, a solid is produced which withstands ordinary handling and storing conditions, and it is readily soluble in the organic liquids to be gelled.

About 0.5% to about 10% by weight of the hydroxy aluminum soap based upon the liquid hydrocarbon, preferably between about 3% and about 6% of soap produces a suitable gel for suspending the finely divided water-soluble solids in accordance with this invention. At about 75° F., for example, from about 3% to about 10% of the mixed soaps disperses in gasoline in from about 15 seconds to about 10 minutes, and gels of suitable viscosity and low liquid loss are produced from the dispersion after about 30 seconds to about 20 minutes.

The gel can be developed within the well and, therefore, since the more viscous gels may be difficult to pump, the soap-liquid hydrocarbon-solids dispersion may be introduced into a well before the maximum viscosity and suspending properties are reached. Accordingly, when the gelation has proceeded to a point at which the viscosity is sufficient to maintain all of the finely divided solids in suspension, the dispersion may be pumped into the well. Thus, the partially gelled liquid may be injected immediately into the formation, or it may be allowed to stand in the well until the maximum gelation has developed.

Ordinarily, the zone to be treated according to my invention is isolated by one or more packers which may be of the mechanical or hydraulically inflatable type. The hydraulic fractionating fluid is pumped into the isolated zone of the well and pressure applied to the fluid. This pressure may be provided by means of mechanical pumps at the surface or by means of generating high gas pressures within the well above the fracturing gel. Such gas pressures may be generated by slow-burning explosives or by units which burn a fuel, such as methane, with an oxidizing gas, such as liquid oxygen. Of course, when employing such gas generating units within the well, means must be provided for confining the gases in contact with the fracturing fluid to be injected into the formation.

Any amount of the fracturing fluid may be injected into the formation fracture, depending upon the extent of fracture desired. A filler liquid, i.e. an inert fluid, such as a crude or refined oil fraction, such as gasoline or kerosene, may be injected into the well following the gelled hydrocarbon suspension to force the suspension further into the formation. As described hereinbelow, such following fluid may comprise a peptizing agent or gel breaker for decreasing the initial suspending properties or high viscosity of the gelled organic liquid.

The pressure on the system is increased due to the retarded tendency of the suspension to filter into the formation. The presence of the finely divided solid material tends to aid the colloidally-dispersed soap in resisting flow into the formation, and consequently the gelled hydrocarbon has increased resistance to flow into the formation. The pressure continues to rise and finally a rather abrupt drop in pressure occurs upon the introduction of additional volumes of the fluid, which indicates that the formation has fractured. This pressure at which the abrupt drop is observed is referred to herein as the "formation breakdown pressure" and is roughly equivalent in pounds per square inch at the fractured formation to the depth of such formation in feet.

Inasmuch as the gelled hydrocarbon portion of the thixotropic suspension tends to obstruct the flow of fluids from the fractured formation, it is removed therefrom after the fracture has been produced. It is desired, however, to remove only the hydrocarbon portion of the suspension and to retain the finely divided solids within the channel. This is done by reducing the viscosity of the gelled hydrocarbon by means of a diluent or a gel breaker, or both. For this purpose, a delayed gel breaker may be incorporated in the suspension to become effective after a time delay. The gel breaker may also be injected into the formation after the suspension. For example, one percent of a gel breaker based upon the total volume of fracturing liquid to be treated may be pumped into the well as the following or filler liquid mentioned above. More than one percent of the breaker is sometimes required, particularly where the soap content of the gel or fracturing liquid is high. A suitable gel breaker is an oil-soluble sulfonate or amine which may be diluted with a solvent such as gasoline, which solvent may be a portion of the filler liquid. This following liquid serves to reduce the suspending properties of the hydrocarbon and permits the removal of the hydrocarbon from the channel. In any event, the resulting oily liquid is of low viscosity and can be produced from the formation to the exclusion of the solids which remain within the channel.

It is also contemplated that in some instances the gel breaker may precede the fracturing liquid, but some of the gels, particularly those produced by the aluminum soaps, are sufficiently unstable as to not require the treatment with any specific gel breaker. With such unstable gels the continued contact with the formation is sufficient to cause the gel to be resolved into a highly fluid form.

When it is desired to produce an impermeable barrier in the fractured channel and when the deposited hydraulic cement is contacted with introduced water, a water-soluble gel breaker such as amine, alkali metal oxides and hydroxides, the stronger acids, sulfonates, or amines may be dissolved in the water or in an oil and water emulsion to accelerate the breaking of the gel after completion of the fracture. Such aqueous gel-breaking fluids, however, will not be used when it is intended to produce a porous channel which might later become impermeable due to unwanted production of water from the fractured stratum.

The proportion of finely divided solids included in a particular suspension may be adjusted from job to job. The depth of the well, the porosity of the formation, the character of the fluids produced from such formations, and the like, will all have their effect. In general, however, between about .5 and about 5 pounds of hydraulically-settable solids per gallon of hydrocarbon liquid may be employed in the suspension, although larger amounts up to 10 and 15 pounds per gallon may be used. The solids may be suspended in the hydrocarbon liquid either during the preparation of the gel or at the time it is being injected into the well. Since the suspensions have only a temporary high viscosity, the suspended solids are deposited from the suspending medium when the viscosity is subsequently reduced within the fracture. Thus, the finely divided solids do not flow back into the well when the hydraulic fracturing fluid is withdrawn.

In a typical operation, inflatable packers are placed above and below the chosen producing zone thereby to isolate a portion of a stratum to be treated. The suspension of hydraulic settable material such as cement clinker in gelled gasoline is then admixed at the well head to give the desired apparent viscosity for low liquid loss, e.g. an apparent viscosity of between about 100 and 200 centipoises or higher. This fracturing fluid is pumped into the well through a heavy walled induction pipe leading to the isolated portion of the formation. The suspension when placed opposite the formation tends to stay within the well and to build up a high pressure due to its inability to penetrate the formation. Sufficient pressure, e.g. 1000 to 3000 or as high as 15,000 p.s.i., is applied to the suspension within the well until the "formation breakdown pressure" is reached. After the formation breakdown pressure has been exceeded, the surface pressure decreases abruptly and levels off at a substantially constant value upon the continued injection of the fracturing fluid. At this point, the injection and pumping may be temporarily stopped to permit the gelled hydrocarbon to set-up in the finer passages of the formation and then re-applying fracturing pressure. By repeated application of fracturing pressure after having permitted the gelled mixture to solidify in the initial fractures, higher pressures can be regained and such fractures are materially enlarged.

After fractures of substantial area have been produced, the gel may be broken by treatment with a solution of an oil-soluble sulfonate and/or washed out of the fracture with gasoline or other penetrating and non-viscous solvent. If desired, the solvent may contain a specific gel breaker. The hydrocarbon of reduced suspending properties is withdrawn from the fracture and the cement clinker props remain therein to provide a permeable channel for non-aqueous fluids. In the event that it is desired to form an impermeable barrier, the hydraulically-settable props may be treated with added water so as to hydrate the solids. However, in the absence of such specific water treatment, the propped channel will remain permeable to oil or gas until sufficient water has been produced with such oil or gas to hydrate the settable solids and shut off flow from the formation. In the event that such does occur and the formation is shut off, then the packers may be replaced above the initial channel and the operation repeated. Thus, the invention can first be used to shut off formation water and then re-employed to provide a channel permeable to well fluids.

In describing my invention, I have made reference to the gelling of the organic liquids by means of metallic soaps. Another material which I can use for preparing the gels is the class of organic derivatives of montmorillonite which forms gels with toluene, 10% ethanol, ethyl acetate, and the like. A 10% mixture of such an organic-substituted bentonie or montmorillonite produces a firm gel having low-liquid-loss characteristics. The gel can be resolved to a low viscosity liquid by the addition of aqueous phosphates and other materials which are in the class of viscosity reducers for thixotropic suspensions of bentonitic clays. For example, tannic acid and the like are effective in reducing the viscosity and any of these viscosity reducers may be used in a manner analogous to that described above in connection with the gel breakers for the metal soap gels.

From the above, it will be apparent that I have provided a method for controlling the productivity of well strata by the exclusion of undesired water from a formation traversed by a well bore. To accomplish this, I may employ an organic hydrophobic fluid suspension of a hydratable solid such as an hydraulic cement, a preferred example of which is Portland cement clinker. The solids perform the dual function of propping a formation fracture and of sealing the fracture upon contact with water. Such water may be introduced through the well bore or may result from encroachment of formation water as, for example, may occur in water coning when producing from a formation which contains water below the oil producing formation. A preferred suspension medium is a petrophilic gel such as may be produced by gelling hydrocarbon liquids described herein.

This application is a continuation of my co-pending application Serial Number 84,746, filed March 31, 1949, entitled "Controlling Productivity of Well Strata," and now abandoned.

Although specific embodiments of my invention have been described, it should be understood that these are by way of illustration only and that the invention is not limited thereto since other embodiments and operating techniques will become apparent to those skilled in the art in view of my disclosure. Accordingly, modifications of my invention are contemplated without departing from the spirit of my described invention or from the scope of the appended claims. For example, the suspension of gelled hydrocarbon and cement clinker can be used to cement casing, the plug of cohesive flow of the gelled carrier serving to remove mud stringers about the casing.

What I claim is:

1. A method of plugging off water production from a formation traversed by a well bore and which produces both water and oil which comprises fracturing said formation by injecting into said well bore a suspension of hydraulic cement in an organic hydrophobic fluid, said hydraulic cement having a particle size of between about 10 and 200 mesh, applying pressure to said suspension sufficient to produce a fracture in said formation, whereby such suspension enters said formation, removing excess suspension from the well bore, and producing water containing fluids from said formation to displace the suspending fluid from the formation and to cause said cement within said formation to set.

2. The method of controlling productivity of a well formation wherein water may be encountered during the production of well fluids therefrom which comprises the steps of introducing into said well an organic hydrophobic fluid suspension of a hydraulically settable solid, applying pressure to said suspension sufficient to produce a fracture in said formation, whereby the fluid suspension enters the fracture within said formation, removing the suspending fluid from said fracture and depositing the hydraulically settable solid within said fracture producing aqueous fluids from said formation through said fracture, and contacting said solids with said fluids produced whereby said solids are hydrated upon the encroachment of water into said producing formation.

3. The method of controlling the productivity of well fluids from a formation penetrated by a well comprising fracturing the formation by injecting into said well a low-penetrating fluid containing a single substance which acts both as a propping agent and as a sealing agent consisting essentially of a slurry of finely divided hydraulic cement in a gelled hydrocarbon liquid, applying pressure to said slurry sufficient to produce a fracture in said formation and to cause said slurry to enter said fracture, removing the gelled hydrocarbon liquid from the fracture leaving the cement to prop open the fracture, and subsequently contacting the cement props with water to cause said props to hydrate and set in said fracture.

4. A method of producing a fluid channel in a stratum traversed by a well bore which comprises the steps of confining a suspension of a single hydraulically settable material which acts both as a propping agent and as a sealing agent in an organic hydrophobic fluid adjacent said stratum, applying pressure to said suspension sufficient to fracture said stratum, pumping additional fluid into said well bore thereby flowing into said produced fracture at least a portion of said fluid suspension, withdrawing excess suspension from the well bore, withdrawing at least a part of the fluid from the fracture thereby leaving hydratable formation props within said fracture, and subsequently contacting said props with water to seal said fracture against the flow of liquid therethrough.

5. A method of controlling the productivity of a formation penetrated by a well bore which comprises disposing adjacent said formation a body of an organic hydrophobic fluid containing a substantial proportion of finely divided solids consisting of hydraulically settable material, applying pressure to said body sufficient to fracture said formation and to displace at least a portion of the suspension into said fracture, withdrawing excess organic hydrophobic fluid and suspended solids from said well bore, and producing fluids from said formation whereby upon encroachment of water said hydraulically settable material is hydrated to seal said fracture against the further flow of liquids therethrough.

6. A method of controlling the productivity of fluids from a formation penetrated by a well bore which comprises the steps of disposing adjacent said formation a body of a gelled liquid hydrocarbon containing a substantial proportion of finely divided cement clinker solids suspended therein, applying a greater-than-formation breakdown pressure to said body whereby the formation is fractured, pumping additional fluid into the well bore thereby forcing at least a portion of the gelled liquid hydrocarbon and suspended cement solids into the produced fracture, discontinuing the pumping of additional liquid into the well bore, reducing the viscosity of the gelled hydrocarbon by contacting with an added gel breaker whereby the cement solids are released from the suspension and deposited within the fracture, and subsequently contacting the deposited cement solids with water.

7. The method of controlling productivity of well fluids from a formation traversed by a well which comprises the steps of confining at a production level in said well a body of gelled hydrocarbon containing between about 0.5 and 15 pounds per gallon of cement clinker having a particle size of between about 40 and 60 mesh, increasing the pressure on said body until the formation is fractured and at least a portion of the gelled hydrocarbon and the suspended cement clinker solids enters said fracture, contacting the suspension within the fracture with a gel breaker thereby decreasing the suspending properties of the gelled hydrocarbon, reducing the pressure on the resultant liquid hydrocarbon, subsequently removing through the well the hydrocarbon from the fracture leaving the cement clinker in the formation, and introducing water through the well bore to contact the cement clinker thereby forming a fluid-impermeable barrier within said formation.

8. The method of controlling productivity of well fluids from a formation traversed by a well which comprises the steps of confining at a production level in said well a body of gelled hydrocarbon containing between about 0.5 and 15 pounds per gallon of a propping agent consisting of ground cement clinker having a particle size of between about 40 and 60 mesh, increasing the pressure on said body until the formation is fractured and at least a portion of the gelled hydrocarbon and the suspended cement clinker propping agent enters said fracture, contacting the suspension within the fracture with a gel breaker thereby decreasing the suspending properties of the gelled hydrocarbon, reducing the pressure on the resultant liquid hydrocarbon, and subsequently removing through the well the hydrocarbon from the fracture leaving the cement clinker propping agent in the formation where it sets as a result of subsequent contact with water thereby forming a fluid-impermeable barrier within said formation.

9. The method of controlling productivity of well fluids from a formation traversed by a well which comprises the steps of disposing adjacent said formation a body of gelled liquid hydrocarbon containing a substantial proportion of a single substance as a propping agent and as a sealing agent in response to the flow of water, said substance consisting of hydraulically settable solids, applying a greater-than-formation breakdown pressure to said body whereby the formation is fractured, pumping additional fluid into the well bore thereby forcing at least a portion of the gelled hydrocarbon and said solids into the produced fracture, discontinuing the pumping of additional liquid into the well bore, reducing the viscosity of the gelled hydrocarbon whereby the solids are released from the suspension and disposed within the fracture to produced a propped channel which is initially permeable to well fluids, and subsequently contacting the solids with water thereby forming a fluid-impermeable barrier within said factured formation.

10. The method of controlling productivity of well fluids from a formation traversed by a well which comprises the steps of confining at a production level in said well a body of viscous hydrocarbon containing between about 0.5 and 15 pounds per gallon of a propping and sealing agent consisting of ground cement clinker having a particle size of between about 10 and 200 mesh, increasing the pressure on said body until the formation is fractured and at least a portion of the viscous hydrocarbon and the suspended cement clinker propping agent enters said fracture, subsequently removing through the well the hydrocarbon from the fracture leaving the cement clinker propping agent in the formation, contacting the cement clinker with water whereby it hydrates to form a fluid-impermeable barrier within said fractured formation.

11. The method of controlling productivity of well fluids from a formation traversed by a well which comprises the steps of confining at a production level in said well a body of gelled hydrocarbon containing between about 0.5 and 15 pounds per gallon of a propping agent consisting of ground cement clinker having a particle size of between about 40 and 60 mesh, increasing the pressure on said body until the formation is fractured and at least a portion of the gelled hydrocarbon and the suspended cement clinker propping agent enters said fracture, contacting the suspension within the fracture with a gel breaker thereby decreasing the suspending properties of the gelled hydrocarbon, reducing the pressure on the resultant liquid hydrocarbon, and subsequently removing through the well the hydrocarbon from the fracture leaving the cement clinker propping agent in the fracture which is initially permeable to well fluids, and introducing water through the well bore to contact the cement clinker whereby it sets and forms a fluid-impermeable barrier within the formation.

12. The method of claim 5 wherein the organic hydrophobic fluid is a gelled hydrocarbon liquid and the hydraulically settable material consists essentially of finely divided Portland cement clinker having a particle size of between about 10 and 200 mesh and being in a concentration of between about 0.5 and 15 pounds per gallon of the gelled hydrocarbon liquid.

References Cited in the file of this patent

UNITED STATES PATENTS

| | | |
|---|---|---|
| 2,019,908 | Kennedy | Nov. 5, 1935 |
| 2,065,512 | Cannon | Dec. 29, 1936 |
| 2,596,843 | Farris | May 13, 1952 |
| 2,645,291 | Voorhees | July 14, 1953 |
| 2,716,456 | Brown | Aug. 30, 1955 |

UNITED STATES PATENT OFFICE
CERTIFICATE OF CORRECTION

Patent No. 2,933,135            April 19, 1960

Everett A. Johnson

It is hereby certified that error appears in the printed specification of the above numbered patent requiring correction and that the said Letters Patent should read as corrected below.

Column 6, line 61, for "water con-" read -- water-con- --; column 7, lines 1 and 2, for "fluids produced" read -- produced fluids --; column 8, line 38, for "produced" read -- produce --; line 41, for "factured" read -- fractured --.

Signed and sealed this 8th day of November 1960.

(SEAL)
Attest:

KARL H. AXLINE
Attesting Officer

ROBERT C. WATSON
Commissioner of Patents